US011423461B2

(12) United States Patent
Faith et al.

(10) Patent No.: US 11,423,461 B2
(45) Date of Patent: Aug. 23, 2022

(54) AUTOMATED PRODUCT COMPARISON

(71) Applicant: ESM Solutions (Europe) Limited, London (GB)

(72) Inventors: Joshua Faith, London (GB); Jonathan Faith, London (GB)

(73) Assignee: ESM Solutions (Europe) Limited, London (GB)

( * ) Notice: Subject to any disclaimer, the term of this patent is extended or adjusted under 35 U.S.C. 154(b) by 223 days.

(21) Appl. No.: 16/174,655

(22) Filed: Oct. 30, 2018

(65) Prior Publication Data

US 2019/0130470 A1 May 2, 2019

(30) Foreign Application Priority Data

Oct. 30, 2017 (GB) .................................... 1717824

(51) Int. Cl.
*G06Q 30/00* (2012.01)
*G06Q 30/06* (2012.01)

(52) U.S. Cl.
CPC ..... *G06Q 30/0629* (2013.01); *G06Q 30/0605* (2013.01); *G06Q 30/0611* (2013.01)

(58) Field of Classification Search
CPC ........... G06Q 30/0629; G06Q 30/0611; G06Q 30/0605
USPC ............................................... 705/26.1–27.2
See application file for complete search history.

(56) References Cited

U.S. PATENT DOCUMENTS

| 7,756,750 | B2 | 7/2010 | Venkiteswaran |
| 8,412,560 | B1 | 4/2013 | Masud et al. |
| 9,262,784 | B2 | 2/2016 | Shi |
| 2007/0073580 | A1 | 3/2007 | Perry et al. |
| 2012/0143725 | A1 | 6/2012 | Hutchinson et al. |
| 2014/0278903 | A1 | 9/2014 | Wang et al. |

OTHER PUBLICATIONS

K. G. Javkar, S. H. Vora, A. S. Rodge, J. Bose and H. Sharma, "Best offer recommendation service," 2016 International Conference on Advances in Computing, Communications and Informatics (ICACCI), 2016, pp. 2430-2436, doi: 10.1109/ICACCI.2016.7732421. (Year: 2016).*

* cited by examiner

*Primary Examiner* — Anand Loharikar
(74) *Attorney, Agent, or Firm* — Finch & Maloney PLLC (57) ABSTRACT

A system for processing a transaction request on an e-commerce platform is provided. The system includes a database unit and a terms for sale comparison unit. The database unit receives information submitted by a plurality of vendors. This information identifies products to be offered for sale and indicates terms. The terms comparison unit retrieves, from the database unit, primary and secondary sets of terms for a product offered for sale by a vendor; retrieves an alternative set of terms for at least one equivalent product offered by another vendor; compares the primary set of terms to the alternative set of terms; and if alternative set of terms are preferable to the primary set of terms, compares the secondary set of terms to the alternative set of terms.

13 Claims, 3 Drawing Sheets

AUTOMATED PRODUCT COMPARISON

RELATED APPLICATIONS

This application claims priority under 35 U.S.C. § 119 to United Kingdom Application No. 1717824.5, filed on Oct. 30, 2017, which is hereby incorporated herein by reference in its entirety.

The present invention relates to processing requests for transactions.

BACKGROUND

The sale of products on e-commerce platforms or e-procurement platforms is becoming ever more popular. E-commerce platforms, commonly referred to as online marketplaces, are used by multiple vendors to host the various products that they offer for sale. On a large e-commerce platform there may be hundreds of millions of products available, and each of those products may be available from multiple vendors. At large scale, designing the architecture of the platform so it operates efficiently is very important.

For example, in an e-commerce environment, each vendor is motivated to offer their products for sale at competitive prices. For this reason, vendors will often use third-party software to set the price at which their products are offered for sale. Typically, such third-party software repeatedly trawls the e-commerce platform to identify equivalent products to the ones being offered by the vendor in question. The third-party software may have the permission to automatically adjust the price of a product offered for sale by the vendor, in dependence on the prices of equivalent products offered for sale by other vendors that it identifies.

An e-commerce platform may host numerous vendors. Each vendor may offer for sale many different products. In some cases, as described above, each individual vendor commissions third-party software to monitor and adjust the price of each of their products.

The continuous trawling of the e-commerce platform by third-party software demands significant bandwidth. That is, a substantial computational demand is placed on the server(s) hosting that e-commerce platform by third-party price setting software alone. This may limit the bandwidth available to shoppers.

In addition, there have been examples of glitches occurring in such third-party software systems. In some examples, glitches have led to the mis-identification of low value products as being equivalent to high value products. For example, a toy/model car might be mis-identified by third-party price setting software commissioned by a first vendor as an equivalent alternative for an actual car being offered for sale by the first vendor. In this example, the afflicted third-party software may automatically and significantly reduce the price of the actual car being offered for sale by the first vendor. Third-party software commissioned by another vendor, and functioning as expected, may identify that actual car having a significantly reduced price, and significantly reduce the price on an equivalent actual car offered for sale by the other vendor. Such a chain reaction can lead to the prices across an e-commerce platform being rapidly driven down to unsustainably low levels. This is harmful to both the vendors, who must honour sales made at significantly reduced prices, and the e-commerce platform, which vendors may be reluctant to continue selling on.

Typically, vendors on an e-commerce platform are only able to submit one set of terms for sale associated with each product. If the terms offered by a first vendor are bettered by the terms offered by another vendor, the first vendor does not get a second chance to win the business of the user. This drives vendors to use said third-party software in order to maintain competitive prices, despite the numerous disadvantages, as described above.

SUMMARY OF THE INVENTION

There is a need for a better system for identifying preferable terms for sale of products offered for sale by multiple vendors on an e-commerce platform that does not suffer the abovementioned disadvantages of existing systems.

Moreover, typical users of an e-commerce platform do not have the time to search through all of the available products offered for sale on an e-commerce platform in order to identify the most preferable terms for sale. There is a need for a system that aids users in quickly and efficiently identifying the most preferable terms for sale associated with a product.

According to a first aspect of the invention there is provided a system for processing a transaction request on an e-commerce platform, the system comprising: a database unit configured to: receive information submitted by a plurality of vendors, the information identifying one or more products to be offered for sale and indicating terms for sale associated with each product; and a terms for sale comparison unit configured to, in response to the transaction request: retrieve, from the database unit, a primary set of terms and a secondary set of terms for a product offered for sale by a first vendor; retrieve, from the database unit, a primary set of terms for at least one equivalent product submitted for sale by one or more other vendors; compare the primary set of terms offered by the first vendor to the primary set of terms submitted by the one or more other vendors; and if a primary set of terms submitted by a second vendor of the one or more other vendors are preferable to the primary set of terms offered by the first vendor, compare the secondary set of terms submitted by the first vendor to the primary set of terms submitted by the second vendor.

The terms for sale comparison unit may further be configured to: if the secondary set of terms submitted by the first vendor are preferable to the primary set of terms submitted by the second vendor, identify the secondary set of terms submitted by the first vendor; or, if the primary set of terms submitted by the second vendor are preferable to the secondary set of terms submitted by the first vendor, identify the primary set of terms submitted by the second vendor.

The system may further comprise a transaction manager, wherein the transaction manager may be configured to: present a set of terms determined in dependence on the identified set of terms and the product associated with the identified terms to a user of the e-commerce platform as an alternative to the primary terms for the product offered for sale by the first vendor.

The terms for sale comparison unit may further be configured to: optimise the identified terms set of terms in dependence on a second-most preferable set of terms, prior to those identified terms being presented to a user of the e-commerce platform by the transaction manager.

The database unit may further be configured to store information regarding a usage history for a user of the e-commerce platform, and the terms for sale comparison unit may further be configured to optimise the identified set of terms further in dependence on the usage history.

The terms for sale comparison unit may further be configured to: retrieve, from the database unit, a secondary set of terms for the at least one equivalent product submitted for sale by the one or more other vendors.

The terms for sale comparison unit may further be configured to: if the secondary set of terms submitted by the first vendor are preferable to the primary set of terms submitted by the second vendor, compare the secondary set of terms submitted by the first vendor to the secondary set of terms submitted by the one or more other vendors.

The terms for sale comparison unit may further be configured to: if the secondary set of terms submitted by the first vendor are preferable to the secondary set of terms submitted by the one or more other vendors, identify the secondary set of terms submitted by the first vendor; or, if a secondary set of terms submitted by a second vendor of the one or more other vendors are preferable to the secondary set of terms submitted by the first vendor, identify the secondary set of terms submitted by the second vendor.

The system may further comprise a transaction manager, wherein the transaction manager may be configured to: present a set of terms determined in dependence on the identified terms and the product associated with the identified terms to a user of the e-commerce platform as an alternative to the primary terms for the product offered for sale by the first vendor.

The terms for sale comparison unit may further be configured to: optimise the identified terms set of terms in dependence on a second-most preferable set of terms prior to those identified terms being presented to a user of the e-commerce platform by the transaction manager.

The database unit may further be configured to store information regarding a usage history for a user of the e-commerce platform, and the terms for sale comparison unit may further be configured to optimise the identified set of terms further in dependence on the usage history.

Each set of terms for sale may comprise individual terms for sale, including any one or more of: monetary price, delivery time and warranty.

The terms for sale comparison unit may be configured to compare sets of terms algorithmically in dependence on the individual terms for sale, in order to identify the more preferable of the compared sets of terms.

The database unit may further be configured to store information regarding a usage history for a user of the e-commerce platform, and the terms for sale comparison unit may be configured to compare sets of terms algorithmically further in dependence on the user's usage history.

The system may further comprise a product identification unit, wherein the database unit may be further configured to: associate a unique identifier with each product submitted by the plurality of vendors; and the product identification unit may be configured to: retrieve, from the database unit, the unique identifier of the product offered for sale by a first vendor; and identify the at least one equivalent product submitted for sale by the one or more other vendors by searching the database unit for products submitted for sale in dependence on the unique identifiers associated with each product.

The information submitted by the plurality of vendors may be received in advance of the transaction request.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
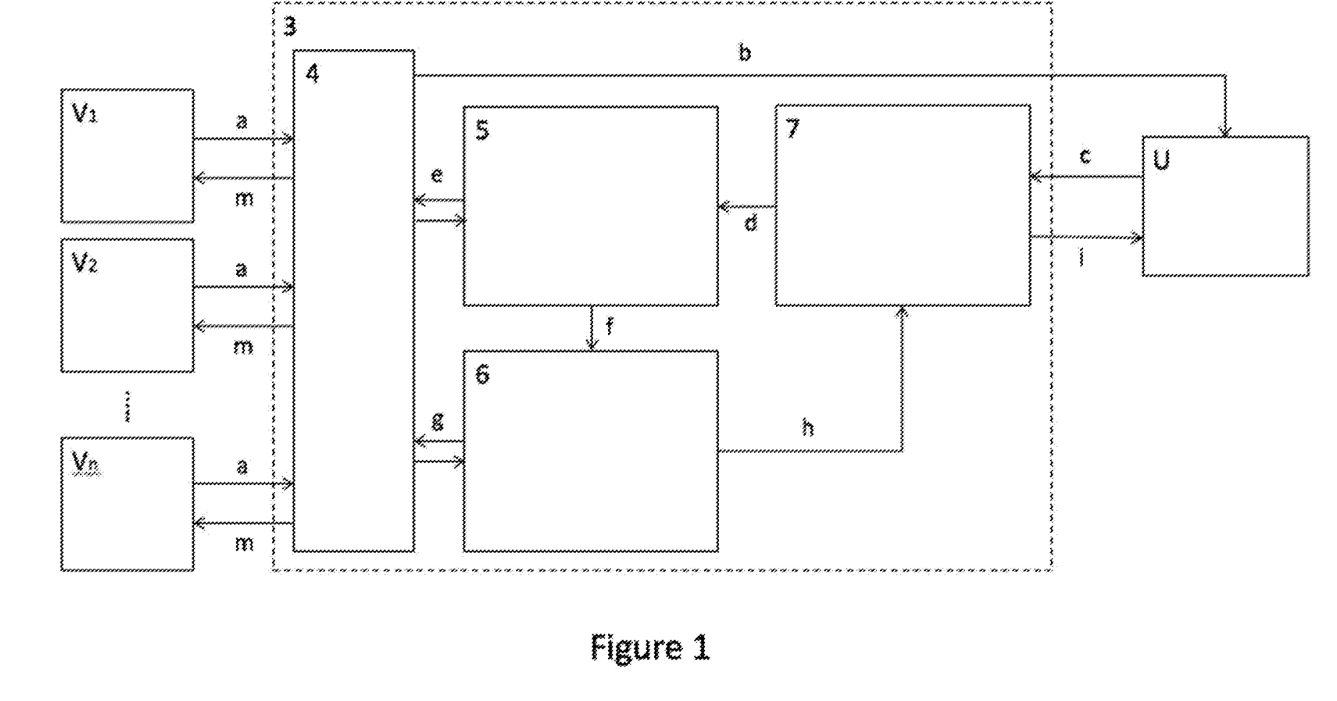
FIG. 1 depicts a schematic overview of the present invention.

FIG. 1 depicts a schematic overview of the present invention.

E-commerce platform (3) may comprise a database unit (4), a product identification unit (5), a terms for sale comparison unit (6), and a transaction manager (7). The following disclosure not intended to be limited to e-commerce platforms, and may equally apply to e-procurement platforms, or any other possible form of online marketplace.

One or more vendors ($V_1$, $V_2$, $V_n$) may submit (a) information to the database unit (4). The database unit may store that information. Said information may comprise an identity and description of products to be offered for sale on the e-commerce platform, and a set of terms for sale associated with each of those products. In FIG. 1, three vendors are depicted submitting information to the e-commerce platform (3), however, this is not intended to be limiting. In fact, any number of vendors may host their products on the e-commerce platform.

A product as referred to herein includes any good, service, commodity or the like sellable, rentable or leasable via an e-commerce platform.

The database unit may associate a unique identifier with each product submitted by the plurality of vendors. The unique identifier may include information identifying the product, including product type, class, dimensions, material, colour, or the like.

Terms for sale as referred to herein includes any conditions on which a sale may be made, including monetary price, delivery time, length of warranty, or the like.

Each vendor may submit a primary set of terms for sale and a secondary set of terms for sale associated with each product. The primary set of terms may be labelled the list terms. That is, the primary set of terms may be the terms at which the associated product is to be advertised for sale on the e-commerce platform. The secondary set of terms may represent the 'most desirable' terms (to a user of the e-commerce platform) at which a vendor is willing to sell the associated product. The secondary set of terms may be labelled as substitute terms, switch terms, or bottom-line terms. The secondary terms may be defined in the same units as the primary terms. That is, the secondary terms may be defined as conditions on which a sale may be made, such as monetary price, delivery time, length of warranty, or the like. Alternatively, the secondary terms may be defined with respect to the primary terms. For example, the secondary terms may be a percentage discount, or a percentage improvement on the primary terms. That is, the secondary set of terms may define a minimum price, minimum delivery time, or maximum warranty, or the like, at which a vendor is willing to sell an associated product. The secondary terms may not be published or advertised on the e-commerce platform.

In some cases, a vendor may not submit a secondary set of terms for sale. In other examples, a vendor may only submit a secondary set of terms in real-time, once the vendor has knowledge of (m) the primary terms submitted by other vendors.

The database unit (4) may populate (b) a user interface (U) of the e-commerce platform with the products offered by the plurality of vendors and their associated primary terms for sale. The user interface may, for example, be a website or a mobile application, or the like.

A user may browse the user interface of the e-commerce platform for a product to purchase. On selecting a product for purchase, the user interface may send a transaction request (c) to the transaction manager (7). A transaction request may be sent to the transaction manager at any time before the transaction is completed. For example, the transaction request may be sent at the point at which a user reaches a "check-out" stage within the user interface.

In response to receiving a transaction request, the transaction manager informs (d) a product identification unit (5) of the product selected by the user for purchase.

The product identification unit (5) may interface (e) with database unit (4). The product identification unit may search the database unit for products submitted for sale on the e-commerce platform equivalent to the product selected for purchase by the user. Equivalent products may be products that are identical or similar to the product selected by the user.

In order to identify equivalent products, the product identification unit (5) may access the unique identifiers associated with each product. Products having corresponding unique identifiers to the product selected by the user for purchase may be deemed to be equivalent products.

Alternatively, the product identification unit (5) may access the stored information regarding the identity and description of products submitted for sale on the e-commerce platform. The identification of equivalent products may be performed by a keyword parsing of the identity and description information of the product selected by the user for purchase, and keyword searching the database unit for equivalent products.

Equivalent products identified by the product identification unit may have been submitted to the e-commerce platform for sale by one or more other vendors, different from the vendor that offers the product selected by the user for purchase.

The product identification unit (5) may inform (f) the terms for sale comparison unit (6) of the product selected by the user for purchase and any identified equivalent products submitted for sale.

The terms for sale comparison unit may interface (g) with the database unit (4). The terms for sale comparison unit may retrieve the terms for sale associated with the product selected by the user for purchase and the terms for sale associated with any identified equivalent products submitted to the e-commerce platform for sale. That is, the terms for sale comparison unit retrieves the primary set of terms for sale associated with the product selected by the user for purchase and any secondary set of terms for sale associated with that product. In addition, the terms for sale comparison unit retrieves primary sets of terms for sale associated with any identified equivalent products. The terms for sale comparison unit may also retrieve secondary sets of terms for any equivalent products.

The terms for sale comparison unit identifies the most preferable of those sets of terms. As described below, the identified most preferable terms for sale are intended to balance the desires of the vendors and the users. For example, if the primary terms offered by a first vendor are more preferable than any of the primary or secondary terms submitted by one or more other vendors, it is the primary terms offered by the first vendor that will be identified as the most preferable terms (rather than the secondary set of terms submitted by the first vendor—which may ultimately be more desirable to the user).

The terms for sale comparison unit may algorithmically identify the most preferable of the submitted terms. That is, the terms for sale comparison unit may rely on an algorithm that quantifies the various conditions specified within each set of terms for sale in order to compare those terms for sale. For example, said algorithm may quantify monetary price, delivery time and length of warranty, or the like, such that a comparison of the relative value of each condition can be made.

Once the most preferable set of terms has been identified, the terms for sale identification unit may optimise that set of terms. That is, the algorithm may raise or lower one or more of the various conditions of the identified set of terms to a level incrementally more desirable than the second-most preferable of the sets of submitted terms. For example, if the identified terms comprise a monetary price of $5, whilst the second-most preferable terms comprise a monetary price of $20, the algorithm may raise the identified terms to, for example, a monetary price of $15. The optimised identified terms are more preferable than any other set of submitted terms, but the vendor is not obliged to sell at their bottom-line terms. In this way, the desires of the vendors and the users may be further balanced.

The algorithm may be capable of machine-learning. That is, based on the usage history of the e-commerce platform, the algorithm may learn how much more preferable the identified terms must be when compared to the terms offered by the first vendor in order to maximize the probability of the user switching to the identified terms. The algorithm may account for this when optimising the identified terms for sale.

For example, the algorithm may first analyse the purchase history of a user. In another example, the algorithm may analyse the purchase history of other users of the e-commerce platform within a user's customer group. Examples of customer groups may include groups of users from the same geographical region or within the same age group. Alternatively, a customer group may be defined by the type of product offered for sale that the user has selected or by the vendor that the user originally selected.

The algorithm may apply weights to the identified terms based on the usage history of the user or their customer group. For example, the algorithm may find that the a user shows a historical preference for speed of delivery. In this case, the algorithm may determine that the monetary cost difference for a cheaper product having a longer delivery time must exceed a predetermined threshold before the user will switch to the identified terms for the cheaper product. The predetermined threshold may be a percentage. For example, the monetary cost threshold may be at least 10% cheaper.

The identified terms may then be forwarded (h) to the transaction manager (7). The transaction manager may forward (i) the identified preferable terms, and the information regarding the product associated with those terms, to the user interface (U) of the e-commerce platform.

The user interface (U) may present these terms and the associated product to a user of the e-commerce platform as an alternative purchase option. The user may choose between the equivalent product associated with the identified most preferable terms, and the product initially selected for purchase with its associated primary terms for sale. That is, the user may choose to switch to purchasing the equivalent product, rather than the product they originally selected for purchase. Alternatively, the user may choose to continue with the purchase of the product they originally selected.

The terms for sale comparison unit (6) may also account for usage history on the e-commerce platform. That is, the database unit (4) may store information regarding which products users typically switch to when offered as an equivalent product for alternate purchase, and which products users typically rejected. The algorithm used within the terms for sale comparison unit may take this information into account when identifying preferable terms.

By accounting for usage history in this way, the misidentification of equivalent products may be mitigated against. For example, if a toy/model car is offered as an equivalent alternative for real car, a user would typically reject the alternative purchase of the toy/model car. The toy/model car would therefore be less likely to be offered as an alternative purchase in the future.

Alternatively, the usage history information stored by the database unit (4) may be accounted for by the product identification unit (5) in the identification of equivalent products.

Identification of the Most Preferable Terms for Sale

The identification of the most preferable terms for sale by the terms for sale comparison unit in two different scenarios will now be described with reference to FIG. 2A and FIG. 2B.

Figure 2A:
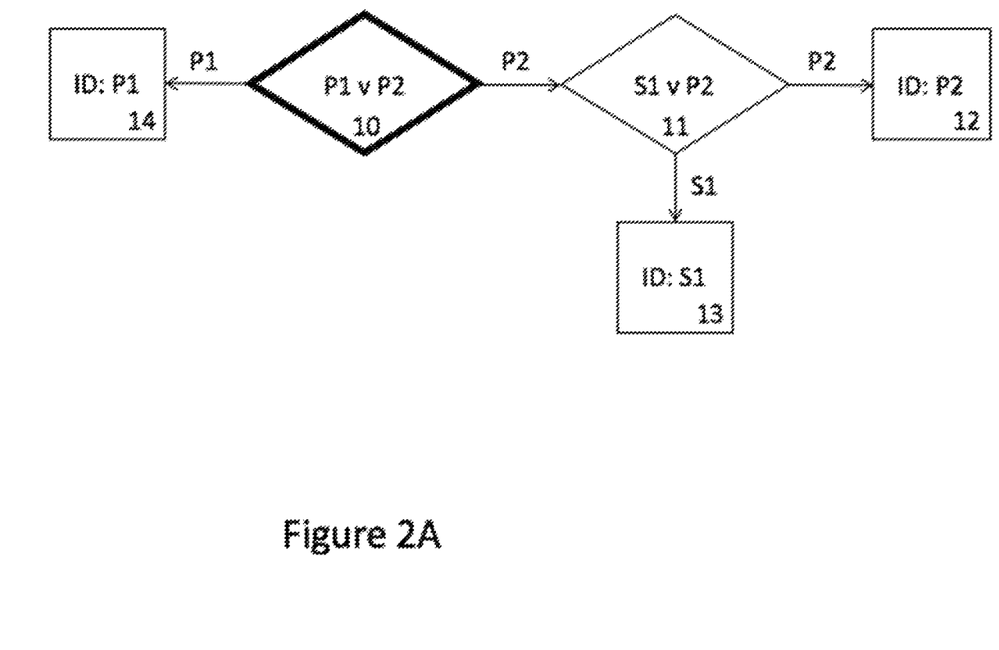
FIG. 2A is a flow diagram depicts an exemplary use of the present invention to identify preferable terms for sale.

FIG. 2A depicts the identification of the most preferable terms for sale in the following scenario. The product initially selected by the user for purchase is offered for sale by a first vendor. The first vendor submits a primary set of terms (P1) and a secondary set of terms (S1) associated with that product. Equivalent products are submitted to the e-commerce platform for sale by one or more other vendors. The one or more other vendors each submit a primary set of terms (P2), but no secondary set of terms, associated with said equivalent products.

The terms for sale comparison unit may first compare (10) the primary set of terms offered by the first vendor (P1) to the each of the primary set of terms submitted by the one or more other vendors (P2).

If comparison (10) finds the primary set of terms offered by the first vendor (P1) to be preferable to each of the primary set of terms submitted by the one or more other vendors (P2), then the primary terms offered by the first vendor (P1) may be identified (14) as the most preferable terms for sale.

If comparison (10) finds a primary set of terms submitted by a second vendor of the one or more other vendors (P2) to be preferable to the primary set of terms offered by the first vendor (P1), then the terms for sale comparison unit may compare (11) the secondary set of terms submitted by the first vendor (S1) to the primary set of terms submitted by the second vendor (P2). That is, if the first vendor's primary terms are bettered by the primary terms submitted by another vendor, the first vendor is allowed a second chance to win the business of the user.

It is worth noting that for comparison (11), in the interests of efficiency, the secondary set of terms submitted by the first vendor (S1) need only be compared to the most preferable of the primary sets of terms submitted by the one or more other vendors. Said terms are referred to herein as the primary set of terms submitted by a second vendor. However, the same end result would be achieved by comparing the secondary set of terms offered by the first vendor (S1) to each of the primary sets of terms submitted by the one or more other vendors.

If comparison (11) finds the secondary set of terms submitted by the first vendor (S1) to be preferable to the primary set of terms submitted by the second vendor (P2), then the secondary set of terms submitted by the first vendor (S1) may be identified (13) as the most preferable terms for sale.

If comparison (11) finds the primary set of terms submitted by the second vendor (P2) to be preferable to the secondary set of terms submitted by the first vendor (S1), then the primary set of terms submitted by the second vendor (P2) may be identified (12) as the most preferable terms for sale.

Figure 2B:
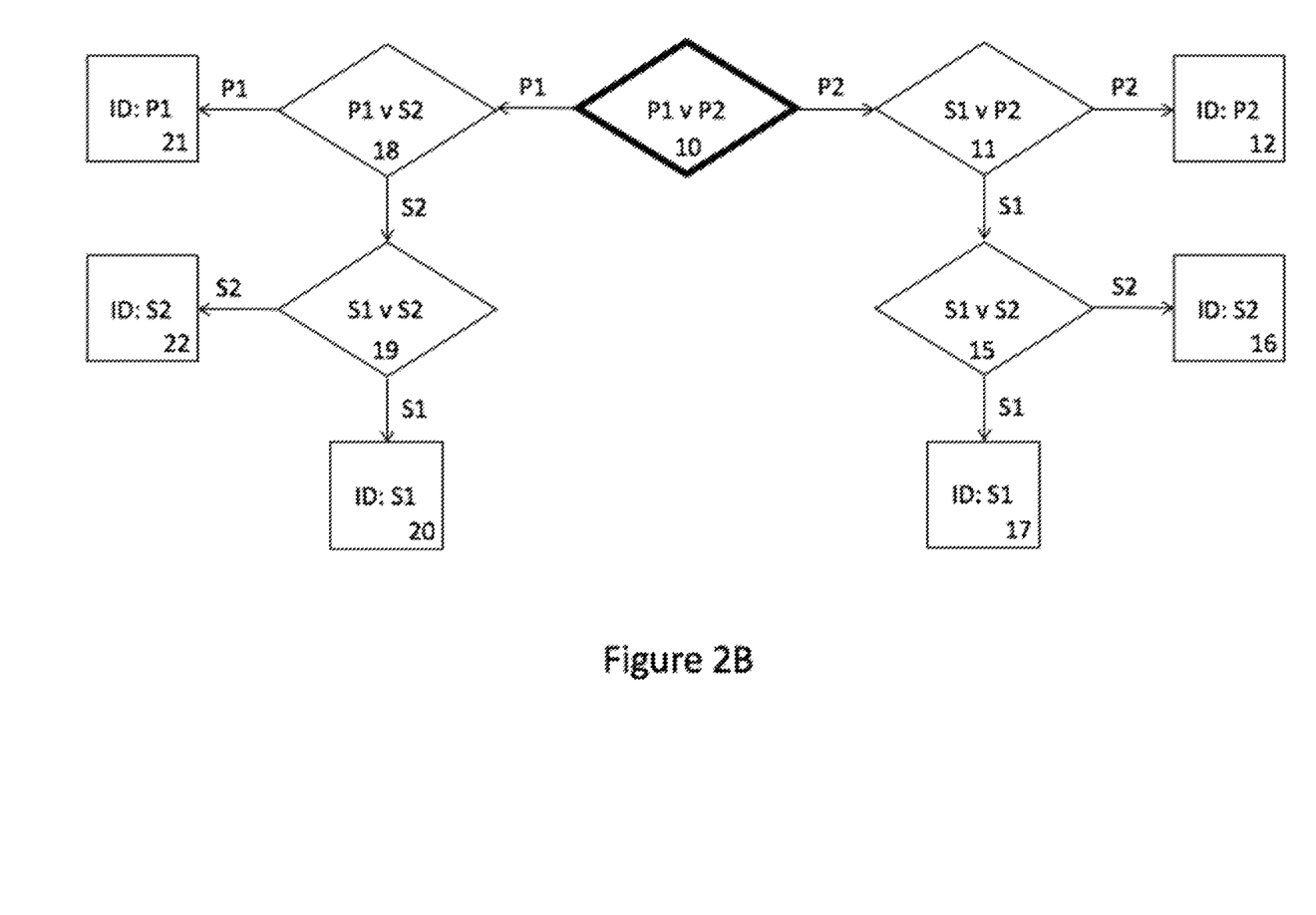
FIG. 2B is a flow diagram depicts an exemplary use of the present invention to identify preferable terms for sale.

FIG. 2B depicts the identification of the most preferable terms for sale in the following scenario. The product initially selected by the user for purchase is offered for sale by a first vendor. The first vendor submits a primary set of terms (P1) and a secondary set of terms (S1) associated with that product. Equivalent products are submitted to the e-commerce platform for sale by one or more other vendors. The one or more other vendors each submit a primary set of terms (P2) and a secondary set of terms (S2), associated with said equivalent products The terms for sale comparison unit may first compare (10) the primary set of terms offered by the first vendor (P1) to the each of the primary set of terms submitted by the one or more other vendors (P2).

If comparison (10) finds a primary set of terms submitted by a second vendor of the one or more other vendors (P2) to be preferable to the primary set of terms offered by the first vendor (P1), then the terms for sale comparison unit may compare (11) the secondary set of terms submitted by the first vendor (S1) to the primary set of terms submitted by the second vendor (P2). That is, if the first vendor's primary terms are bettered by the primary terms submitted by another vendor, the first vendor is allowed a second chance to win the business of the user.

If comparison (11) finds the primary set of terms submitted by the second vendor (P2) to be preferable to the secondary set of terms submitted by the first vendor (S1), then the primary set of terms submitted by the second vendor (P2) may be identified (12) as the most preferable terms for sale.

If comparison (11) finds the secondary set of terms submitted by the first vendor (S1) to be preferable to the primary set of terms submitted by the second vendor (P2), then the terms for sale comparison unit may compare (15) the secondary set of terms submitted by the first vendor to each of the secondary sets of terms submitted by the one or more other vendors. It is worth noting that the vendor of the one or more other vendors with the most preferable primary terms, may not necessarily have the most preferable secondary terms. That is, different vendors may submit primary and secondary terms with varying ranges of difference between their primary set of terms and their secondary sets of terms. Therefore, for comparison (15), it may be necessary to compare the secondary set of terms submitted by the first vendor to each of the secondary sets of terms submitted by the one or more other vendors (rather than only to the secondary set of terms submitted by the vendor with the most preferable primary set of terms).

If comparison (15) finds the secondary set of terms submitted by the first vendor (S1) to be preferable to each of the secondary set of terms submitted by the one or more other vendors (S2), then the secondary set of terms submitted by the first vendor (S1) may be identified (17) as the most preferable terms for sale.

If comparison (15) finds a secondary set of terms submitted by a second vendor of the one or more other vendors (S2) to be preferable to the secondary set of terms submitted by the first vendor (S1), then the secondary set of terms submitted by the second vendor (S2) may be identified (16) as the most preferable terms for sale.

Alternately, if comparison (10) finds the primary terms offered by the first vendor (P1) to be preferable to each of the primary sets of terms submitted by the one or more other vendors (P2), then the terms for sale comparison unit may compare (18) the primary set of terms offered by the first vendor (P1) to each of the secondary sets of terms submitted by to one or more other vendors (S2). That is, if the one or more other vendor's primary terms are bettered by the primary terms offered by the first vendor, the one or more other vendors are allowed a second chance to win the business of the user.

If comparison (18) finds the primary set of terms offered by the first vendor (P1) to be preferable to each of the secondary sets of terms submitted by the one or more other vendors (S2), then the primary set of terms offered by the first vendor (P1) may be identified (21) as the most preferable terms for sale.

If comparison (18) finds a secondary set of terms submitted by a second vendor of the one or more other vendors (S2) to be preferable to the primary set of terms offered by the first vendor (P1), then the terms for sale comparison unit may compare (19) the secondary set of terms submitted by the first vendor (S1) to the secondary set of terms submitted by the second vendor (S2).

It is worth noting that for comparison (19), in the interests of efficiency, the secondary set of terms submitted by the first vendor (S1) need only be compared to the most preferable of the secondary sets of terms submitted by the one or more other vendors (referred to herein as the secondary set of terms submitted by a second vendor). However, the same end result would be achieved by comparing the secondary set of terms submitted by the first vendor (S1) to each of the secondary sets of terms submitted by the one or more other vendors.

If comparison (19) finds the secondary set of terms submitted by the first vendor (S1) to be preferable to the secondary set of terms submitted by the second vendor (S2), then the secondary set of terms submitted by the first vendor (S1) may be identified (20) as the most preferable terms for sale.

If comparison (19) finds the secondary set of terms submitted by a second vendor of the one or more other vendors (S2) to be preferable to the secondary set of terms submitted by the first vendor (S1), then the secondary set of terms submitted by the second vendor (S2) may be identified (22) as the most preferable terms for sale.

Selected Advantages Over Prior Art Systems

The following description of advantages is not intended to be limiting. Other advantages beyond those described below are also envisaged over the prior art.

The identification of the most preferable terms for sale as described herein is advantageous over prior art third party software systems for a number of reasons.

The continuous trawling of the e-commerce platform by third-party software is eliminated. This is because, the comparison of terms for sale is only performed for a product at the point at which a transaction request is sent. Furthermore, the comparison of terms for sale is performed within the e-commerce platform itself, and so there is no need for the involvement of external third-party software. This saves significant bandwidth and substantially reduces the computational demand placed on the server(s) hosting that e-commerce platform. Thus, the instances of crashes on e-commerce platforms may be reduced. Additionally, the limited bandwidth resources available may be used more efficiently.

As the primary and secondary sets of terms for sale are all pre-set and submitted by the vendors, instances of chain reactions that lead to the prices across an e-commerce platform being rapidly driven down to unsustainably low levels (as described in the background section) may be eliminated. That is, the prices can only drop as low as a price that has been submitted by a vendor (and seemingly therefore a price considered sustainable by that vendor).

The mis-identification of equivalent products may be mitigated against. For example, if a toy/model car is offered as an equivalent alternative for real car, a user may merely reject the alternative purchase of the toy/model car. The benefits of accounting for usage history in mitigating against product mis-identification are also described above.

The system of FIG. 1 is shown as comprising a number of functional blocks. This is schematic only and is not intended to define a strict division between different logic elements of such entities. Each functional block may be provided in any suitable manner in logic and/or hardware.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a non-transitory, computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A system for processing a transaction request on an e-commerce platform, the system comprising:
   a user interface;
   at least one processor coupled to the user interface;
   a database unit configured to:
      receive information submitted by a plurality of vendors, the information identifying one or more products to be offered for sale and indicating terms for sale associated with each product, the information comprising a primary set of terms and a secondary set of terms for a product offered for sale by a first vendor and a primary set of terms for at least one equivalent product submitted for sale by one or more other vendors comprising a second vendor;
   a terms for sale comparison unit executable by the at least one processor and configured to, in response to the transaction request:
      retrieve, from the database unit, the primary set of terms and the secondary set of terms for the product offered for sale by the first vendor;
      retrieve, from the database unit, the primary set of terms for the at least one equivalent product submitted for sale by the one or more other vendors;
      compare the primary set of terms offered by the first vendor to the primary set of terms submitted by the one or more other vendors;
      if the primary set of terms submitted by the second vendor of the one or more other vendors are preferable to the primary set of terms offered by the first vendor, compare the secondary set of terms submitted by the first vendor to the primary set of terms submitted by the second vendor;
      if the secondary set of terms submitted by the first vendor are preferable to the primary set of terms submitted by the second vendor, identify the secondary set of terms submitted by the first vendor; and
      if the primary set of terms submitted by the second vendor are preferable to the secondary set of terms submitted by the first vendor, identify the primary set of terms submitted by the second vendor; and
      optimise the identified set of terms to generate a determined set of terms by using a machine-learning algorithm to raise or lower one or more terms of the identified set of terms through application of one or more weights thereto, the machine-learning algorithm trained via analysis of one or more of a purchase history of a user, a purchase history of a group of users, or a usage history of the e-commerce platform; and
   a transaction manager executable by the at least one processor and configured to present, via the user interface, the determined set of terms and the product associated with the determined set of terms to a user of the e-commerce platform as an alternative to the primary terms for the product offered for sale by the first vendor.

2. The system of claim 1, wherein the terms for sale comparison unit is further configured to:
   optimise the determined set of terms in dependence on a second-most preferable set of terms prior to the determined set of terms being presented to a user of the e-commerce platform by the transaction manager.

3. The system of claim 2, wherein the database unit is further configured to store information regarding a usage history for a user of the e-commerce platform, and the terms for sale comparison unit is further configured to optimise the determined set of terms further in dependence on the usage history.

4. The system of claim 1, wherein the terms for sale comparison unit is further configured to:
   retrieve, from the database unit, a secondary set of terms for the at least one equivalent product submitted for sale by the one or more other vendors.

5. The system of claim 4, wherein the terms for sale comparison unit is further configured to:
   if the secondary set of terms submitted by the first vendor are preferable to the primary set of terms submitted by the second vendor, compare the secondary set of terms submitted by the first vendor to the secondary set of terms submitted by the one or more other vendors.

6. The system of claim 5, wherein the terms for sale comparison unit is further configured to:
   if the secondary set of terms submitted by the first vendor are preferable to the secondary set of terms submitted by the one or more other vendors, identify the secondary set of terms submitted by the first vendor; and
   if a secondary set of terms submitted by a second vendor of the one or more other vendors are preferable to the secondary set of terms submitted by the first vendor, identify the secondary set of terms submitted by the second vendor.

7. The system of claim 1, wherein each set of terms for sale comprise individual terms for sale, including any one or more of: monetary price, delivery time and warranty.

8. The system of claim 7, wherein the terms for sale comparison unit is configured to compare sets of terms algorithmically in dependence on the individual terms for sale, in order to identify the more preferable of the compared sets of terms.

9. The system of claim 8, wherein the database unit is further configured to store information regarding a usage history for a user of the e-commerce platform, and the terms for sale comparison unit is configured to compare sets of terms algorithmically further in dependence on the user's usage history.

10. The system of claim 1, further comprising a product identification unit, wherein the database unit is further configured to:
   associate a unique identifier with each product submitted by the plurality of vendors; and
   the product identification unit configured to:
      retrieve, from the database unit, the unique identifier of the product offered for sale by a first vendor; and
      identify the at least one equivalent product submitted for sale by the one or more other vendors by searching the database unit for products submitted for sale in dependence on the unique identifiers associated with each product.

11. The system of claim 1, wherein the information submitted by the plurality of vendors is received in advance of the transaction request.

12. A non-transitory computer readable medium storing sequences of instructions executable by one or more processors to process a transaction request on an e-commerce platform, the sequences of instructions comprising instructions to:

receive information submitted by a plurality of vendors, the information identifying one or more products to be offered for sale and indicating terms for sale associated with each product, the information comprising a primary set of terms and a secondary set of terms for a product offered for sale by a first vendor and a primary set of terms for at least one equivalent product submitted for sale by one or more other vendors comprising a second vendor; and, in response to receipt of the transaction request:

retrieve a primary set of terms and a secondary set of terms for a product offered for sale by a first vendor;

retrieve a primary set of terms for at least one equivalent product submitted for sale by one or more other vendors;

compare the primary set of terms offered by the first vendor to the primary set of terms submitted by the one or more other vendors;

if a primary set of terms submitted by a second vendor of the one or more other vendors are preferable to the primary set of terms offered by the first vendor, compare the secondary set of terms submitted by the first vendor to the primary set of terms submitted by the second vendor;

if the secondary set of terms submitted by the first vendor are preferable to the primary set of terms submitted by the second vendor, identify the secondary set of terms submitted by the first vendor;

if the primary set of terms submitted by the second vendor are preferable to the secondary set of terms submitted by the first vendor, identify the primary set of terms submitted by the second vendor;

optimise the identified set of terms to generate a determined set of terms by using a machine-learning algorithm to raise or lower one or more terms of the identified set of terms through application of one or more weights thereto, the machine-learning algorithm trained via analysis of one or more of a purchase history of a user, a purchase history of a group of users, or a usage history of the e-commerce platform; and present, via a user interface coupled to the one or more processors, the determined set of terms and the product associated with the determined set of terms to a user of the e-commerce platform as an alternative to the primary terms for the product offered for sale by the first vendor.

13. The computer readable medium of claim 12, wherein the sequences of instructions further comprise instructions to:

optimise the determined set of terms in dependence on a second-most preferable set of terms prior to the determined set of terms being presented to a user of the e-commerce platform.

* * * * *